US011873202B2

(12) United States Patent
Gaafar et al.

(10) Patent No.: US 11,873,202 B2
(45) Date of Patent: Jan. 16, 2024

(54) OPENING TOOL FOR BEVERAGE CANS

(71) Applicant: Anheuser-Busch InBev S.A., Brussels (BE)

(72) Inventors: Robert Gaafar, New York, NY (US); Maisie Devine, New York, NY (US); Patrick O'Riordan, New York, NY (US); Hilary Farnsworth, Hauppage, NY (US); Peter Daly, Hauppage, NY (US); Doreen Swift, Hauppage, NY (US); Ralph Cassara, Hauppage, NY (US); Glenn Drost, Hauppage, NY (US); Rodney McGaugh, Hauppage, NY (US)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 24 days.

(21) Appl. No.: 17/745,388

(22) Filed: May 16, 2022

(65) Prior Publication Data

US 2022/0274820 A1 Sep. 1, 2022

Related U.S. Application Data

(63) Continuation of application No. 16/643,752, filed as application No. PCT/EP2018/073454 on Aug. 31, 2018, now Pat. No. 11,332,355.

(30) Foreign Application Priority Data

Sep. 1, 2017 (BE) .................................. 2017/5611

(51) Int. Cl.
*B67B 7/40* (2006.01)

(52) U.S. Cl.
CPC .................................. *B67B 7/403* (2013.01)

(58) Field of Classification Search
CPC ..................................................... B67B 7/403
(Continued)

(56) References Cited

U.S. PATENT DOCUMENTS

| | | | |
|---|---|---|---|
| 2,765,005 | A | 10/1956 | Wellekens |
| 2,851,324 | A | 9/1958 | Wellekens |

(Continued)

FOREIGN PATENT DOCUMENTS

| | | | |
|---|---|---|---|
| CN | 204802964 | U | 11/2015 |
| DE | 102005006562 | A1 | 8/2006 |

(Continued)

OTHER PUBLICATIONS

International Search Report issued by the European Patent Office in connection with International Application No. PCT/EP2018/073454, dated Oct. 11, 2018.

(Continued)

*Primary Examiner* — Tom Rodgers

(74) *Attorney, Agent, or Firm* — George Likourezos; Carter, DeLuca & Farrell LLP

(57) ABSTRACT

The present invention discloses an opening tool for opening and/or removing a tab portion of a beverage can. The opening tool includes a hollow housing. The hollow housing includes a generally cylindrical housing body having a top end, a bottom end, an outer surface, an inner surface and an open cavity extending from a top end towards a bottom end of the housing body. The opening tool further includes one or more claws, having a claw body extending between a claw end portion and a claw tip such that the tip of each of the claws is adapted to be hangingly disposed within the open cavity of hollow housing. In operation, when a beverage can is passed through the hollow housing from the bottom end towards the top end, the claw tip of at least one (Continued)

of the claws engages and pulls-opens the tab portion while the beverage can moves out of the housing.

18 Claims, 9 Drawing Sheets

(58) Field of Classification Search
USPC .... 81/3.56, 3.55, 3.44, 3.41, 3.4, 3.29, 3.37, 81/3.36, 3.27, 3.31, 3.15, 3.09, 3.08, 3.07; 53/381.1, 492
See application file for complete search history.

(56) References Cited

U.S. PATENT DOCUMENTS

| | | | | | |
|---|---|---|---|---|---|
| 3,392,879 | A | * | 7/1968 | Blea | G07F 11/02 221/129 |
| 3,447,662 | A | | 6/1969 | House | |
| 3,710,922 | A | | 1/1973 | Lanphere et al. | |
| 3,710,978 | A | | 1/1973 | Cosby | |
| 3,752,357 | A | | 8/1973 | Harris | |
| 3,805,643 | A | | 4/1974 | Turner et al. | |
| 5,107,728 | A | | 4/1992 | Siekierke | |
| 5,255,775 | A | | 10/1993 | Buehren et al. | |
| 5,555,778 | A | | 9/1996 | Otters et al. | |
| 5,916,337 | A | | 6/1999 | Caniglia et al. | |
| 6,199,720 | B1 | | 3/2001 | Rudick et al. | |
| 6,286,715 | B1 | | 9/2001 | Ziesel et al. | |
| 6,575,325 | B2 | | 6/2003 | Dickie et al. | |
| 6,945,137 | B1 | | 9/2005 | Hawkins | |
| 7,905,340 | B2 | | 3/2011 | Monti | |
| 10,332,331 | B2 | | 6/2019 | Li et al. | |
| 2004/0089105 | A1 | | 5/2004 | Saviano et al. | |
| 2009/0078718 | A1 | | 3/2009 | Kirschner | |
| 2012/0000927 | A1 | | 1/2012 | Carpentier et al. | |
| 2012/0097694 | A1 | | 4/2012 | Gelardi | |
| 2013/0112702 | A1 | | 5/2013 | Roekens et al. | |
| 2015/0197362 | A1 | | 7/2015 | Sato | |
| 2016/0038992 | A1 | | 2/2016 | Arthur et al. | |

FOREIGN PATENT DOCUMENTS

| | | | | | |
|---|---|---|---|---|---|
| DE | 102007027864 | A1 | | 12/2008 | |
| EP | 2256703 | A1 | | 12/2010 | |
| EP | 2610827 | A1 | | 7/2013 | |
| ES | 2332626 | A1 | * | 2/2010 | A47F 1/10 |
| GB | 1300565 | A | | 12/1972 | |
| JP | H04364811 | A | | 12/1992 | |
| JP | H07251897 | A | | 10/1995 | |
| JP | H08110983 | A | | 4/1996 | |
| JP | 2002056451 | A | | 2/2002 | |
| WO | 9605578 | A1 | | 2/1996 | |
| WO | 9802853 | A1 | | 1/1998 | |

OTHER PUBLICATIONS

International Search Report issued by the European Patent Office in connection with International Application No. PCT/EP2018/073454, dated Jun. 12, 2018.

* cited by examiner

OPENING TOOL FOR BEVERAGE CANS

CROSS-REFERENCE TO RELATED APPLICATIONS

This application is a continuation of U.S. patent application Ser. No. 16/643,752, filed Mar. 2, 2020, which claims benefit of International Application No. PCT/EP2018/073454, filed Aug. 31, 2018, which claims benefit of Belgium Patent Application BE2017/5611A, filed Sep. 1, 2017, the entire contents of each of which are hereby incorporated herein by reference.

FIELD OF INVENTION

The present invention relates generally to an opening tool. More particularly, the present invention relates to an opening tool for opening/removing a tab portion of a beverage can.

BACKGROUND OF THE INVENTION

Over the last few decades, there has been a considerable rise in use of beverage cans for variety of purposes such as, for example, storing various personal grooming and household products including, among others, food products such as pickles, beverages, beer, and the like.

Particularly within the beverage industry, the use of different kind of beverage cans for storage and distribution of liquids has significantly increased due to various factors such as relative cost advantages and durability of beverage cans.

These beverage cans generally includes a main body section having generally a cylindrical shape with surface having a uniform diameter, and a separate closure member at the top and/or bottom portion. Generally, the closure member at the top is a pull tab which may be opened by user for opening the can for the purpose of drinking.

With development of various vending machines, the sale of such beverage cans have been increased many folds. however such vending machines dispenses the beverage cans in a closed state and therefore the user is required to pull-open the tab portion of the can for drinking the beverage.

Conventionally, opening the can has been difficult because a user must often use their fingernail to get under the tab and lift it for opening. This is often burdensome because a user may get injured and his nails may get damaged while applying a force to open the tab.

There has been numerous efforts in developing various tool for opening such tab portion of the beverage cans. These tool generally includes a narrow edged device having a handle. Such narrow edge is inserted below the tab and a force is applied by the user using the handle thereby opening the tab.

U.S. Pat. No. 6,575,325 discloses a pull tab opener for opening a tab of a can. The opener includes at least a pair of protrusions extends upwardly from the base of the tab so that, when the rear lever portion is pivoted about the crease line, An opposed front faces of the protrusions contact each other, and the elastic memory of the tab is overcome so that the tab is articulated into a bent condition and make a passage which pass the beverage out from the can.

U.S. Pat. No. 5,555,778, discloses a convex curved shaped opening tool having a working end for opening the tab of a can. The working end is dimensioned for insertion under the hole of a pull tab without lifting the pull tab hole sufficiently to bread the seal of the can top. The tool further has a stop element for limiting insertion of the working end through the finger opening.

U.S. Pat. No. 5,916,337, discloses a pull ring for the opening of pop-top or pull-top cans. The pull ring consists of a flat portion with two attached arms. The two arms with large opening enough to accommodate entry of a portion of the tab of the pull-top or pop-top can. The ring has one or more protrusions on the arms, opposite the flat portion, in order to provide gripping with the tab of the can. Further, the arms can pass through the hole in the tab for installation on the tab and generally upstanding relative to such surface to facilitate grasping of the pull ring and opening of the can.

Apart from such opener tools, there has been some efforts to provide an opening mechanism within the vending machines. One such mechanism include as mentioned in JP08110983A, in which an automatic vending machine having a can opening device is disclosed. The can opening device of the vending machine enables any purchaser to easily pull and raise the pull tab of a canned beverage. The can opening device includes an engaging part which is engaged with the pull tab and a holding plate connected to the engaging part extended in the opposite direction of the pull tab and a holding plate support part counterclockwise inclined at about 70° to the holding plate. The can may be opened by first inserting the engaging part to a hole of the pull tab and then pulling and rotating the can to the front, to open the can. While such a can opening device is easy to operate, it still requires a manual action for opening the can.

A further general problem in the context of beverage can vending machine is the problem of closed beverage cans being used as projectiles on events or in stadiums. If the consumer would not be given the choice to leave the can closed or to open it, it would alleviate the above problem. In addition, it would allow the use of beverage cans, and can vending machines further into the stadium or venue with allayed safety concerns.

While all the above mentioned tools and techniques negates the use of the nails for opening the tab portion, the user still needs to apply force using these dedicated tools for opening the beverage can. Further, these tools can must be used carefully and may cause injury to the user. Additionally, in some instances, the use of these tools may also cause spillage of the beverage because of sudden forceful removal of the tab portion.

As can be seen from the foregoing discussion, there still exists a need for a force-free can opening tool that is easy to operate, safe for usage and which may also be utilized within vending machines without requiring changes to present can designs.

SUMMARY OF THE INVENTION

In one aspect of the present disclosure, an opening tool for opening and/or removing a pull tab of the beverage can already filled with a fluid such as beverage, or the like, is provided. The opening tool includes a hollow housing. The hollow housing includes a generally cylindrical housing body having a top end, a bottom end, an outer surface, an inner surface and an open cavity extending from a top end towards a bottom end of the housing body. The opening tool further includes one or more claws, having a claw body extending between a claw end portion and a claw tip such that the tip of each of the claws is adapted to be hangingly disposed within the open cavity of hollow housing. In operation, when a beverage can is passed through the hollow housing from the bottom end towards the top end, the claw tip of at least one of the claws engages and pulls the tab portion while the beverage can moves out of the housing.

Potentially, the claw body is a generally concave shaped body extended from the end portion between and towards the claw tip.

Further potentially, the claw tip is adapted to slide under the tab portion of the beverage can such that when the can is moved out of the housing in an upward direction, the claw body pivotally pull opens the tab Generally, the end portion of the claw is adapted to be attached to the hollow housing.

Optionally, the end portion of the claw is connected to the hollow housing using a connection mechanism selected from but not limited to hinges-pin based connection mechanism, snap-fit connection mechanism, grate-lock connection mechanism, screw-based connection mechanism, or any of the suitable fixation mechanism known in the art.

Preferably, the housing body has a diameter 1 cm-10 cm greater than a diameter of the beverage can.

Further, the opening tool may include a tightening mechanism for reducing the diameter of the hollow housing, for use in the instances where the diameter of the beverage can is very smaller than the hollow housing.

Furthermore, the tightening mechanism is selected from but not limited to one of sealing rings, tightening screws, belt tightening, or any other suitable tightening mechanism already known in the art.

Optionally, the opening tool further includes a manual movement mean for moving the beverage can axially from the bottom end towards the top end.

Alternatively, the movement mean may be an automatic movement mean selected from one or more from the group consisting of electric/hydraulic motors, automatic pistons, automatic gear mechanism, elevator platform, and the like.

Optionally, the opening tool may include a tab orienting mechanism for orienting the tab of the can corresponding to at least one of the one or more claws.

Further optionally, the tab orienting mechanism may include a combination of a friction wheel and a switch idler for orienting a tab.

Preferably, the hollow housing may be made of a material selected from one of but not limited to metals or plastic and in particular, thermoset polymers such as polyoxymethylene (POM), Acrylonitrile butadiene styrene (ABS), Nylon 6, Nylon 6-6, Polyamides (PA), Polybutylene terephthalate (PBT), Polycarbonates (PC), Polyetheretherketone (PEEK), Polyetherketone (PEK), Polyethylene terephthalate, (PET), Polyimides, Polyphenylene sulfide (PPS), Polyphenylene oxide (PPO), Polysulphone (PSU), and Polytetrafluoroethylene (PTFE/Teflon).

Further preferably, the claw may be made of a hard material such as a steel with a coating of a material selected but not limited to thermoset polymers such as polyoxymethylene (POM), Acrylonitrile butadiene styrene (ABS), Nylon 6, Nylon 6-6, Polyamides (PA), Polybutylene terephthalate (PBT), Polycarbonates (PC), Polyetheretherketone (PEEK), Polyetherketone (PEK), Polyethylene terephthalate, (PET), Polyimides, Polyphenylene sulfide (PPS), Polyphenylene oxide (PPO), Polysulphone (PSU), and Polytetrafluoroethylene (PTFE/Teflon) or thermoset resins such as selected from group consisting of but not limited to selected from a group consisting of: Polyurea, Bis-maleimides, Epoxy, Phenolic, Melamine formaldehyde, Polyester, Polymide, Polyurethane, Urea-formaldehyde, Epoxy and Novolac In another aspect of the present disclosure, a method for opening a pull tab of a beverage can is disclosed. The method include pushing the beverage can through the hollow housing of the opening tool from the bottom end towards the top end such that the claw tip of at least on of the claws slidingly engages under the tab portion of the beverage can. The method further include obtaining a relative movement between the beverage can by continuing the movement of the beverage can in the upward direction such that the engaged claw pivotally pull open the tab portion.

In yet another aspect of the present disclosure, a vending machine employing the opening tool of the current invention is disclosed. This tool will enable a beverage can vending machine to deliver beverage cans leaving the vending machine in opened state such that a consumer does not have the choice anymore the leave the can closed.

The details of one or more implementations are set forth in the accompanying drawings and the description below. Other aspects, features and advantages of the subject matter disclosed herein will be apparent from the description, the drawings, and the claims.

DETAILED DESCRIPTION OF THE PREFERRED EMBODIMENTS

Figure 1:
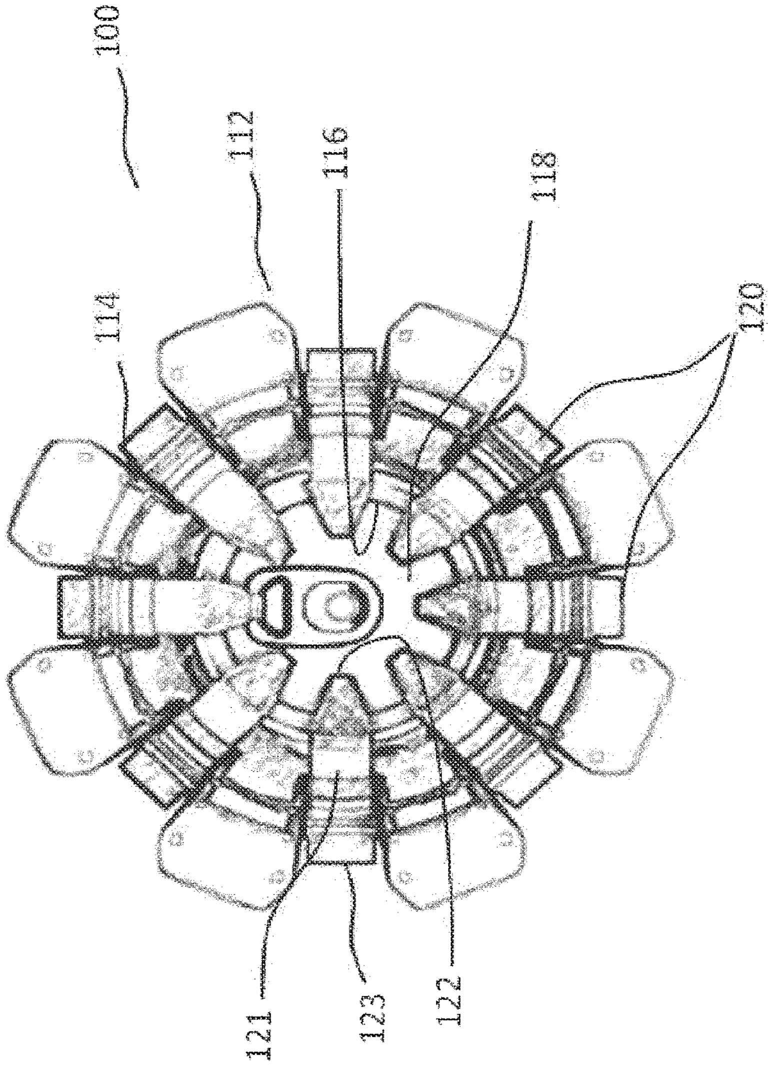
FIG. 1 illustrates a perspective view of an opening tool for opening/removing a tab portion of a beverage can, in accordance with an embodiment of the present disclosure.

As required, a schematic, exemplary-only embodiment of the present application is disclosed herein; however, it is to be understood that the disclosed embodiment is merely exemplary of the present disclosure, which may be embodied in various and/or alternative forms. Specific structural and functional details disclosed herein are not to be interpreted as limiting, but merely as a basis for the claims and as a representative basis for teaching one skilled in the art to variously employ the present disclosure in virtually any appropriately detailed structure.

Aspects, advantages and/or other features of the exemplary embodiment of the disclosure will become apparent in view of the following detailed description, which discloses various non-limiting embodiments of the invention. In describing exemplary embodiments, specific terminology is employed for the sake of clarity. However, the embodiments are not intended to be limited to this specific terminology. It is to be understood that each specific portion includes all technical equivalents that operate in a similar manner to accomplish a similar purpose.

Exemplary embodiments may be adapted for many different purposes and are not intended to be limited to the specific exemplary purposes set forth herein. Those skilled in the art would be able to adapt the exemplary-only embodiment of the present disclosure, depending for example, on the intended use of adapted embodiment. Moreover, examples and limitations related therewith brought herein below are intended to be illustrative and not exclusive. Other limitations of the related art will become apparent to those of skill in the art upon a reading of the following specification and a study of the related figures.

The present application discloses a opening tool for opening a tab portion of a beverage can already filled with a fluid such as for example, beverages, beer, or the like. The opening tool while being hand-held, allows the possibility of a easy, safe and comfortable opening of beverage cans. Accordingly, the opening tool being hand-held and easy to operate enables the opening of already filled beverage cans by the end-consumer as per his desire. Further, the opening tool of the current invention may be utilized within the vending machine to enable the possibility of dispensing a ready to drink beverage can there through. In a preferred embodiment, the opening tool includes a hollow housing extended towards a gripping portion. The hollow housing includes a generally cylindrical shaped hollow housing having a an inner surface, an outer surface, and an open cavity extended from a top end towards a bottom end. The opening tool further includes one or more generally spaced apart claws for pull-opening the tab portion of the beverage cans.

It is to be understood that unless otherwise indicated this invention need not be limited to applications in beverage cans. As one of ordinary skill in the art would appreciate, variations of the invention may be applied to other food storage cans. Moreover, it should be understood that embodiments of the present invention may be applied in combination with various known machines, tools, and/or devices, to achieve any desired application. It must also be noted that, as used in this specification and the appended claims, the singular forms “a,” “an” and “the” include plural referents unless the context clearly dictates otherwise. Thus, for example, the term “an opening” is intended to mean a single opening or a combination of openings, “a claw” is intended to mean a single claw or a combination of plurality of claws.

FIG. 1 illustrates a opening tool 100 for opening a tab portion of a beverage can (not shown). The opening tool 100 includes a hollow housing. The hollow housing 110 includes a generally cylindrical shape hollow housing body 112 having an outer surface 114, an inner surface 116 and an open cavity 118 longitudinally extending between a top end $E_T$ of the hollow housing body 112 towards a bottom end $E_B$ of the hollow housing body 112. The open cavity 118 is generally a cylindrical bore having a diameter $D_{OC}$ greater than a diameter $D_C$ (not shown) of the beverage can to be opened using the opening tool 100. The opening tool 100 further includes one or more claws 120 having a body portion 121 extending between a claw tip 122 and a claw end portion 123. The claw tip 122 of the claw 120 is generally a pointed edge adapted to be received under a tab portion of the [not shown] beverage can, such that when the can is moved in an upward direction, the claw 120 engaged with the tab portion pivotally pull opens the can.

Optionally, the opening tool 100, and one or more gripping portion 140 configured onto the outer surface 114 of the housing 110. Preferably, the hollow housing 110 and the gripping portion 140 is a one-piece arrangement and integrally molded together. However, in some embodiments, the hollow housing 110, and the one or more gripping portions 140 are separate modules of the opening tool 100 and may be attached or detached as according to the requirement.

It is to be contemplated for a person skilled in the art that while the disclosure has been detailed with an exemplary two piece beverage can, it will be readily appreciated that the opening tool 100 of this invention may be used in conjunction with any conventional beverage can having a pull-tab type of opening. Further, while any kind of variation may be applied to the shape, size, material, cross-section, etc of the beverage can and accordingly the variations may be applied to the opening tool 100 for working thereon.

Figure 2A:
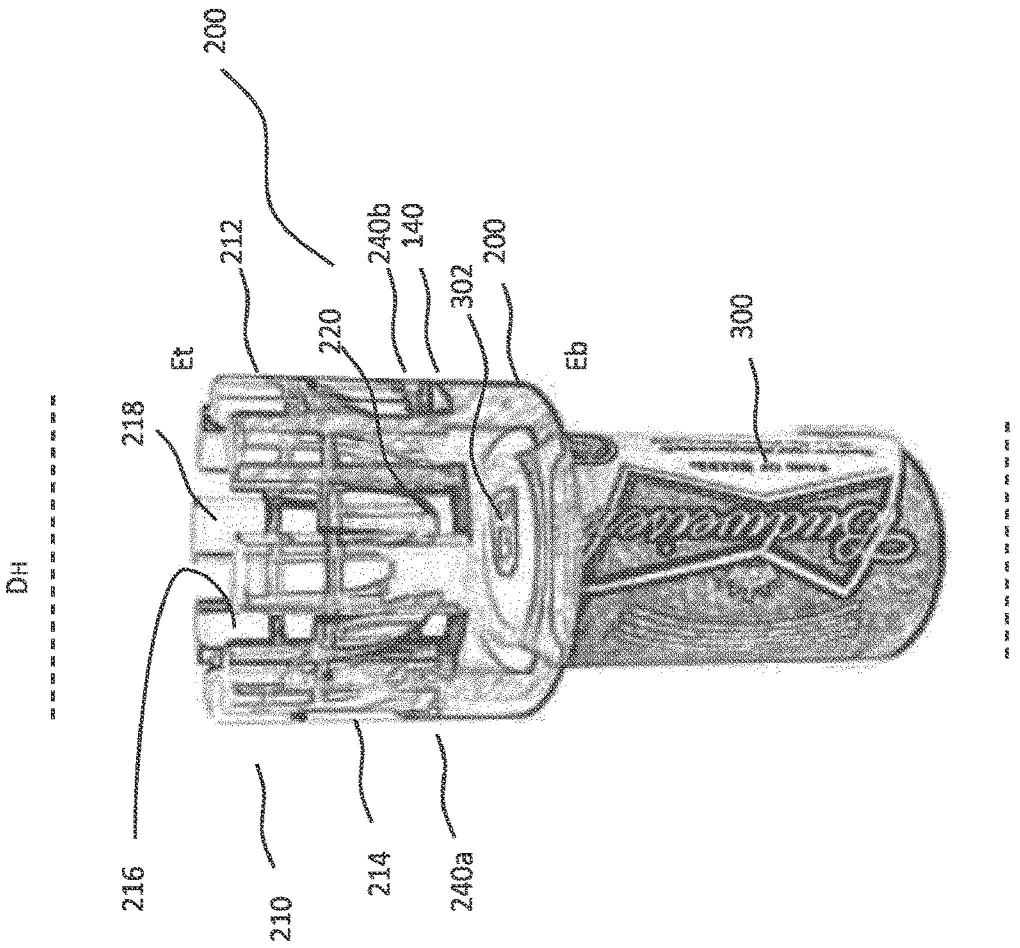
FIG. 2*a* illustrates a perspective view of an opening tool for opening/removing a tab portion of a beverage can, in accordance with a first preferred embodiment of the present disclosure.
Figure 2B:
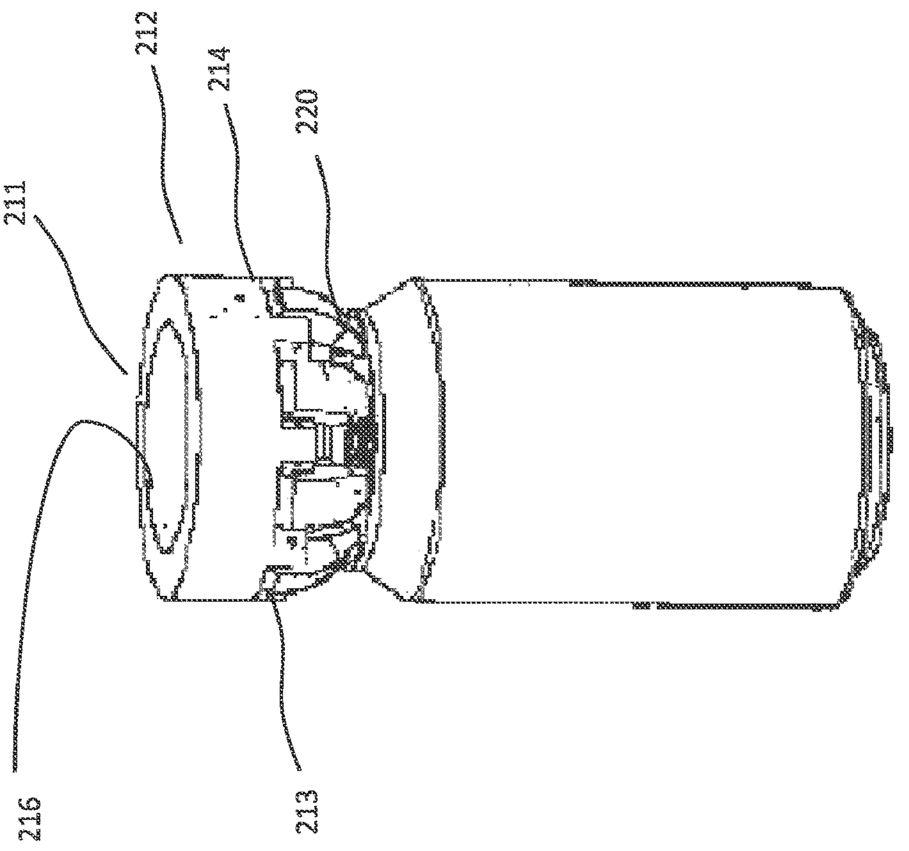
FIG. 2*b* illustrates a schematic view of an opening tool for opening/removing a tab portion of a beverage can, in accordance with a first preferred embodiment of the present disclosure.

FIGS. 2*a* and 2*b* illustrates a opening tool 200 in accordance with a preferred embodiment of the present invention. The opening tool 200 may be used to open a tab portion 302 of a beverage can 300.

Figure 3:
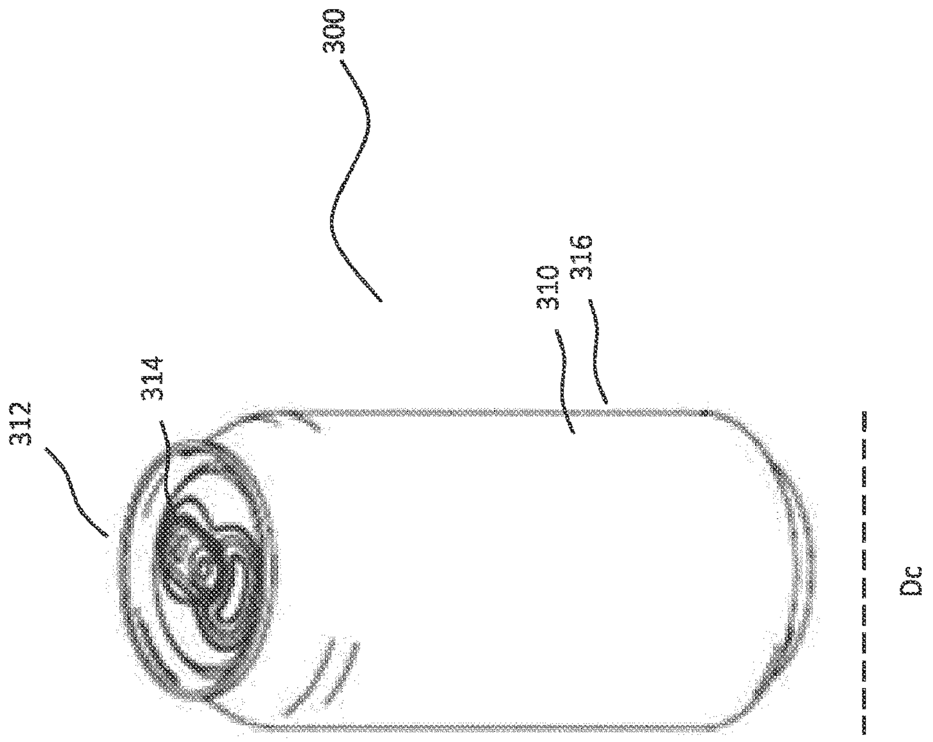
FIG. 3 illustrates a perspective view of beverage can having a tab-portion, in accordance with an embodiment of the present disclosure.

As illustrated in FIG. 3, the beverage can 300 is a conventional can body, preferably a two piece beverage containers made of a metal material, particularly aluminum. The beverage can 300 consists of a can body portion 310 having a diameter $D_C$. The body portion 310 includes a top portion 312, a tab portion 314 and a continuous sidewall 316.

The opening tool 200, as illustrated in FIG. 2, includes a hollow housing 210, a first gripping portion 240*a* and a second gripping portion 240*b*.

The hollow housing 210 includes a generally cylindrical shape hollow body 212 having an outer surface 214, an inner surface 216 and an open cavity 218 longitudinally extending between a top end $E_T$ of the hollow housing 212 towards a bottom end $E_B$ of the body 212. In preferred embodiments of the present invention, the hollow housing 212 has a diameter $D_H$ more than the diameter $D_C$ of the beverage can 300. The difference in the diameter generally depends upon the length of the claws 220.

The hollow housing 110 further includes one or more generally spaced apart claws 220 attached thereto at any desired portion thereof. As illustrated in FIG. 2*b* the plurality of spaced apart claws 220 are attached onto on a bottom surface 213 thereof. Alternatively, in other embodiments, the claws 220 may be attached onto any desired portion of the housing body 212 in any desired configuration, the desired portion selected from but not limited to a top surface 211, the outer surface 214, and the inner surface 216.

Figure 4:
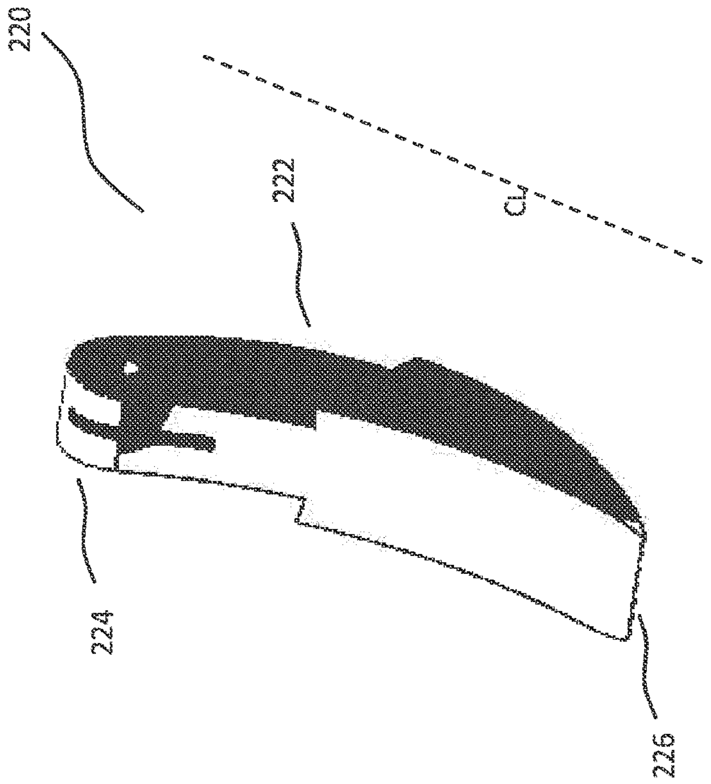
FIG. 4 illustrates a schematic view of a claw for opening/removing the tab portion of the beverage can, in accordance with an embodiment of the present disclosure.
Figure 8:
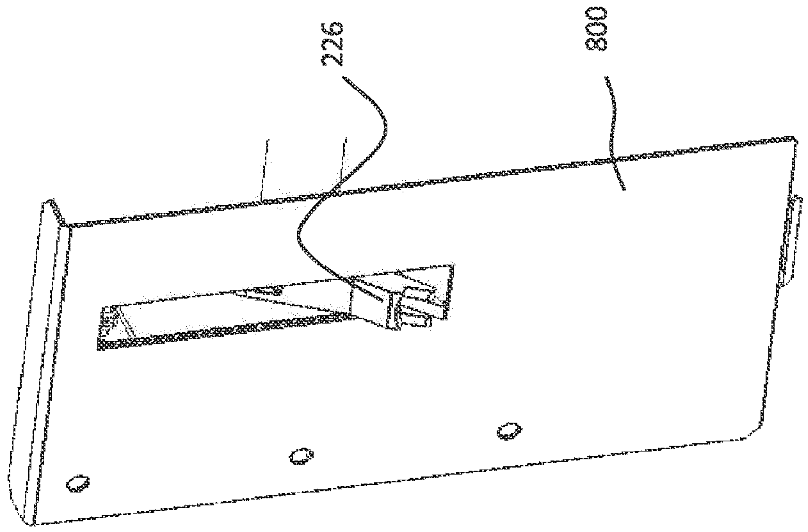
FIG. 8 depicts a claw attached to an attachment surface.

As illustrated in FIG. 4, the one or more claws 220 may be a generally known claw structure having a generally conical shaped body portion 222 extending from a claw end portion 224 towards a generally pointed shaped claw tip 226 hangingly disposed axially within the open cavity 218. Such a pointed shape of the claw tip 226 extended from a concave body portion 222 enables it to slide under the tab portion 314 of the beverage can 300 when moving from the bottom end $E_B$ towards the top end $E_T$. Alternatively in some embodiments of the present invention, the claw tip 226 and the claw body portion 222 may be of any shape that may suitably engage the tab portion 314 of the beverage can 300. The claw 120 further includes a connection mechanism 320 at the claw end portion 224 for enabling an attachment of the claw 120 on to a suitable attachment surface 800 [as illustrated in FIG. 8] that may/may not be a part of the opening tool 200. For example, in some instances, the attachment surface 800 may an attachment plate that may be moved close to the housing body 212 if required. In an embodiment of the present invention, the connection mechanism 320 may be a hinged connection mechanism. In such a an embodiment, the end portion 224 includes hinge holes adapted to be inserted into the corresponding pin at the attachment surface. Thereafter, the hinges are locked thereby attaching the claws onto the desired surface. In other embodiments, the connection mechanism may include spaced apart grated openings present on the attachment surface. The end portion 224, in such instances may include locking pins/or any other locking shape, such that when inserted into the grated openings, the claws are locked onto the attachment surface. In other embodiments, any known mechanism that may be used to suitably connect the claws 220 onto the desired surface such that the claw body 222 is pivotally movable with respect to the attachment surface 800 and the claw tip 226 is hangingly disposed within and/or axially to the open cavity 218 of the housing body 212. Further, the claw 120 is generally of a length $C_L$ more than the difference $D_O$ between the $D_H$ of the housing body 212 and the diameter $D_C$ of the beverage can 300. The difference $D_O$ may preferably have a value ranging between 1 cm and 10 cm.

In some embodiments of the present invention, particularly in the embodiments where the diameter of the housing body 212 is more than a maximum diameter of the beverage can 300 such that the claw tip 226 will not be able to reach the tab portion 314 thereof, the opening tool 200 comprises a tightening mechanism (not shown) for tightening the hollow housing 110 towards the beverage can 300. Such a tightening may be performed to achieve the desired value range for the diameter $D_O$.

In some instances, the tightening mechanism may be tightening nut and screw based tightening mechanism. In such embodiments, the hollow housing may be closed loop body having open ends which when connected completes the loop. In such mechanism a threaded nut may be provided on one of the end of the hollow housing and a bolt is which contains a pin is provided on the other end. The pin of the bolt may be arranged for turning relative to the bolt about an axis of the thread, wherein the pin and the nut are turned together relative to the bolt until the bolt is subjected to a predetermined tensile stress and the hollow housing 210 is moved close towards the beverage can 300.

In another embodiments, the tightening mechanism may be selected from but not limited to one of tightening clamps, sealing rings, tightening screws, belt tightening, or the like. In yet other embodiments, the tightening mechanism may be any suitable tightening mechanism known in the art.

In some embodiments, the opening tool 200 may include one or more automatic movement means for moving the beverage can 300 axially from the bottom end towards the top end. The automatic movement mean may be an elevating platform driven by one or more of but not limited to the group consisting of an electric motor, an automatic piston, driving pulley and various other suitable driving means already known in the art.

The automatic movement mean is particularly required in the instances where the opening tool 200 is utilized as an independent and self-sustaining tool. For example, when used within a vending machine or in combination with a vending machine, or any other similar situation. In such situation, the opening tool may work individually and/or together with the additional system so as to open the beverage can 300.

In such embodiments, the opening tool 200 may further include a control unit (not shown) for controlling the operation/working/of automatic movement means.

In some embodiments, the control unit may includes a data capturing unit for receiving an update of presence of the beverage can on automatic movement means. The control unit may further include a processor unit for processing the data captured by the data capture unit on the basis of predetermined logics/rules for facilitating the movement of the automatic movement means. The control unit may further include an instruction unit that delivers the instructions to various components such as various motors, driving units, or the like, to facilitate a desired and smooth operation.

In some embodiments, the control unit may be provided as a computer program product, such as may include a computer-readable storage medium or a non-transitory machine-readable medium maintaining instructions interpretable by a computer or other electronic device, such as to perform one or more processes. A non-transitory machine-readable medium includes any mechanism for storing information in a form (including a processing application or software) readable or interpretable by a machine (such as a computer). The non-transitory machine-readable medium may take the form of, but is not limited to, any known storage technique, including magnetic storage media, optical storage media, magneto-optical storage media; read only memory (ROM); random access memory (RAM); erasable programmable memory (including EPROM and EEPROM); flash memory; and otherwise.

Figure 5:
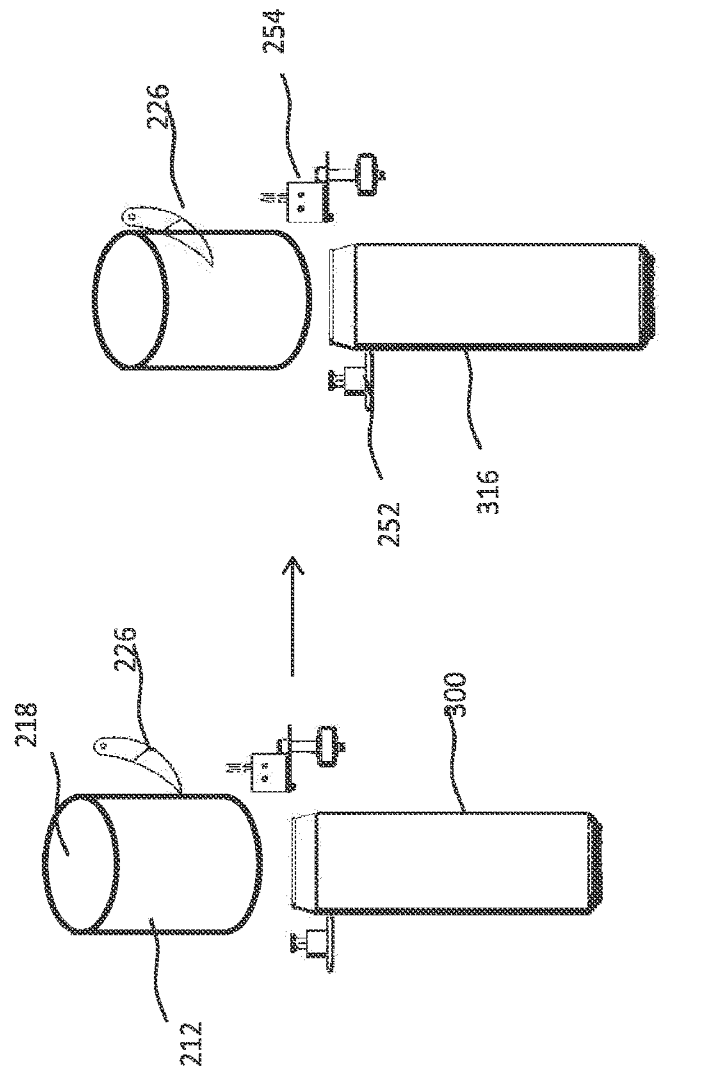
FIG. 5 illustrates a perspective view of an opening tool for opening/removing a tab portion of a beverage can, in accordance with a second preferred embodiment of the present disclosure.

In an embodiment of the present invention, as illustrated in FIG. 5, the opening tool 200 include only one claw 220 attached onto the attachment surface 800 placed away from the housing 210. In such an embodiment, the tool 200 includes a mechanism for moving the attachment surface 800 such that the claw tip is hangingly disposed within the open cavity 218 through one or more opening within the housing body 212. Further in such embodiments, the opening tool 200 includes a tab-orienting mechanism 250 for orienting the tab 314 of the can 300 such that orientation of tab is in accordance with a direction of the claw tip 226 hangingly disposed within the housing 210. In one such example, the tab orienting mechanism 250 includes a combination of a friction wheel 252, a switch idler 254 and a tab orienting drive motor [not shown]. In such examples, when the claw is in the operating position, the friction wheel 252 is allowed to come in contact with the sidewalls 316 and the switch idler 254 is allowed to come in contact with the top portion 312 of the beverage can 300 for sensing the orientation of the tab portion 314. The switch idler 254 is oriented in a direction corresponding to the direction of the claw tip 226. In use, the tab orienting drive motor rotates the friction wheel 252 which in turns rotates the beverage can 300. The rotation is continued until the switch idler 254 detects the presence of the tab portion 314 thereby orienting it in a direction of the claw tip 226. Once oriented, the beverage can 300 is moved up vertically such that during the upward movement, the claw tip 226 slidingly engages the tab portion 314 of the beverage can 300 and pulls it while the can is kept moving upwardly away from the claw body 222 thereby opening the can 300. Generally, in such embodiments, the automatic movement means such as the elevator platform is utilized to vertically hold the beverage can 300 and to move it vertically upwards.

Preferably, the hollow housing 210 and the radial claw 220 may be made of a material selected from one of but not limited to thermoset polymers that exhibits desirable wear and acceptable formability characteristics. The preferred thermoset polymers may be selected from one of but not limited to the group consisting of polyoxymethylene (POM), Acrylonitrile butadiene styrene (ABS), Nylon 6, Nylon 6-6, Polyamides (PA), Polybutylene terephthalate (PBT), Polycarbonates (PC), Polyetheretherketone (PEEK), Polyetherketone (PEK), Polyethylene terephthalate, (PET), Polyimides, Polyphenylene sulfide (PPS), Polyphenylene oxide (PPO), Polysulphone (PSU), and Polytetrafluoroethylene (PTFE/Teflon).

Alternatively, the hollow housing 210 and radial claw 220 may be made of a hard material such as a steel with a coating of a material selected but not limited to thermoset polymers such as polyoxymethylene (POM), Acrylonitrile butadiene styrene (ABS), Nylon 6, Nylon 6-6, Polyamides (PA), Polybutylene terephthalate (PBT), Polycarbonates (PC), Polyetheretherketone (PEEK), Polyetherketone (PEK), Polyethylene terephthalate, (PET), Polyimides, Polyphenylene sulfide (PPS), Polyphenylene oxide (PPO), Polysulphone (PSU), and Polytetrafluoroethylene (PTFE/Teflon) or thermoset resins such as selected from group consisting of but not limited to selected from a group consisting of: Polyurea, Bis-maleimides, Epoxy, Phenolic, Melamine formaldehyde, Polyester, Polymide, Polyurethane, Urea-formaldehyde, Epoxy and Novolac FIG. 6 with reference to FIGS. 1 through 5, is a flow diagram illustrating a method 600 of using the opening tool 200 for opening the beverage can 300 already filled with a fluid such as beverage, or the like. The method starts at step 602 and proceeds to an optional step 604, where the beverage can 300 is oriented according to the claw tip 226. This is generally required in the embodiments in which the opening tool 200 includes only a single claw 220 for opening/removing the tab portion 314 of the beverage can 300. Thereafter, the method 600 then proceeds to step 606 where the beverage can 300 is pushed through the hollow housing 210 of the opening tool 200 and further proceeds to step 608 where the tab portion 314 is brought in contact with the claw tip 226 of the one or more claws 220 such that the claw tip 226 slidingly moves under the tab 314. In some embodiments, the one or more claw portions 220 may be attached to the housing body 212. In some other embodiments, the one or more claw portions 220 may be attached to the attachment surface 800 away from the housing body 212. In such instances, the claw tip 226 is hangingly disposed within the open cavity 218 through one or more openings within the housing body 212.

The method 600 then proceeds to step 610 where a relative movement between the beverage can 300 and the claw body 322 is obtained by allowing the can 300 move vertically upwards even after the engagement with the claw tip 326 thereby pivotally pull-opening the tab portion 314. The method 600 then proceeds to step 612 where the beverage can 300 is released from the hollow housing 210 to obtain a beverage can 300 with the tab portion 314 removed/opened, to provide a ready to drink beverage can 300.

INDUSTRIAL APPLICABILITY

The present disclosure relates to a hand-held opening tool 100 for opening/removing tab portions of beverage cans. The opening tool, while being cost-efficient and portable, is very quick and easy to be operated by end consumers, or by the retailers in various shops, bars etc without the need of applying any pressure/force onto the tab portion of the beverage can.

Further, the opening tool 100 of the current disclosure reduces the problem of liquid spillage due to the sudden application of pressure onto the beverage cans. This may be explained as an impact of the applying the pressure on the beverage can, in earlier known techniques of opening the beverage can which often caused a sudden spillage due to the inertia of the beverage stored inside. However, since the opening tool of current disclosure does not require and sudden pressure/force to be applied, the problem of beverage spillage is avoided.

As should be appreciated, the realization of such opening tool allows the end consumer to safely and quickly open the beverage cans. While the opening tool of current disclosure may function as an independent self-sustaining unit, the tool 200 may also be integrated with various vending machines known in the art, thereby providing the consumer with a ready to drink beverage cans out of the vending machine.

Figure 7:
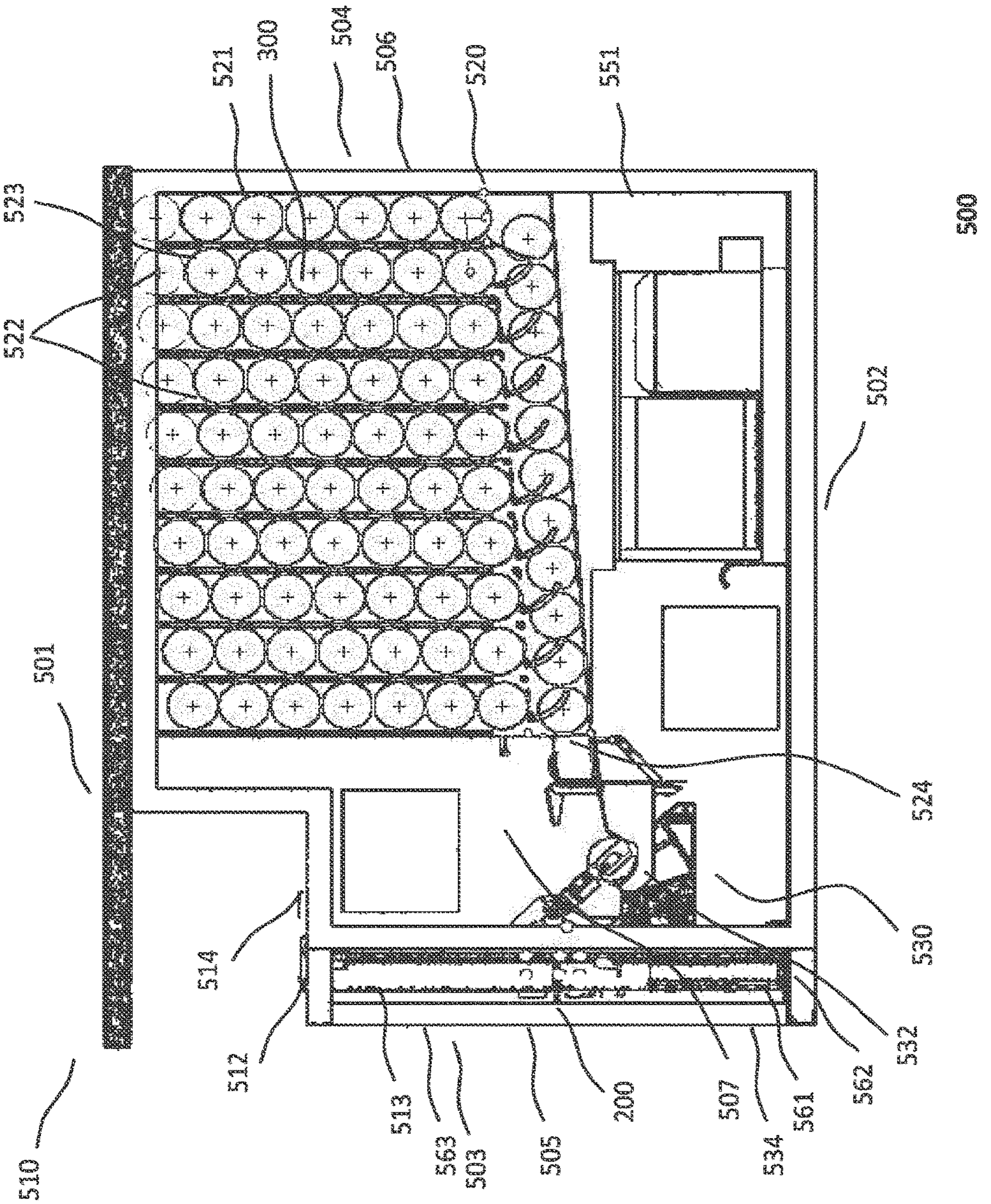
FIG. 7 depicts a vending machine employing the opening tool, in accordance with an embodiment of the present disclosure.

FIG. 7 illustrates an exemplary vending machine 500 employing the opening tool 200 of the current disclosure. The vending machine 500 includes a main housing 510 having a generally quadrilateral shape having a top portion 501, bottom portion 502, front portion 503 and a back portion 504 extending between a first side 505 and a second side 506 defining an interior space 507 within the main housing 510. The main housing 510 includes a delivery slot 512 and a payment interface 514 configured onto a top portion 501 thereof.

The delivery slot 512 is generally an opening slot into the main housing 510 connected to a tubular structure 513 extending into the interior space 507 of the main housing 510 and adapted to receive the beverage can 300 stored within the vending machine 500. The payment interface 514 is an interface configured to accept payment using a plurality of known mechanism The interior portion 507 of the main housing 510 includes a refrigerant compartment 520 for storing the beverage cans 300 in a cooled state and a delivery sub-system 530 for delivering the beverage can 300 from the refrigerant compartment 520 to the delivery slot 512 through the tubular structure 513.

The refrigerant compartment 520 includes a top compartment 521 for storing the plurality of beverage cans 300 partitioned from a base refrigerant unit 551 through a generally declining plate 552 extending towards a refrigerant door of the refrigerant compartment 520. The base refrigerant unit 551 may be any conventionally known refrigerant unit known in the art, and suitable to be used with the vending machines.

The top compartment includes a plurality of columns 522, each capable of storing a stack 523 of beverage cans 300, and having a release door 524 at a lower portion CI thereof. The compartment 521 further includes a motor assembly for releasing (opening)/locking (closing) the release door 524.

The refrigerant compartment 520 further includes a door opening mechanism for opening the refrigerant door such that only one beverage can 300 may be dispensed out of the refrigerant compartment towards the delivery sub-system 530 at a receiving station 532 thereof.

The delivery sub-system 530 as disclosed earlier receives the beverage can 300 at the receiving station 532. The receiving station 532 is generally a trough shaped open case having a diameter adapted to comfortably receive the beverage can 300.

The delivery sub-system 530 further includes an elevator station 534 adapted to deliver the beverage can 300 received at the receiving station 532. The elevator station 534 is further adapted to deliver the beverage can 300 to the delivery slot 512. The elevator station 534 includes a base elevator platform 561 rigidly attached to an elevator back plate 562, and an elevator shaft 563 connected to the delivery slot 512 through the tubular structure 513. The elevator platform 561 is adapted to receive the beverage can 300 and deliver it to the delivery slot 512 thereby making the can 300 accessible to the consumer.

The elevator station 534 may be functionally connected to the receiving station 532 through an orienting station. The orienting station 536 receives the beverage can 300 from the receiving station 532, orients and places it onto the elevator platform 561 in a top upright direction. The delivery sub-system 530 further include a transfer mechanism for transferring the beverage can 300 from the receiving station 532. The transferring mechanism may be any suitably known transfer mechanism known in the art.

The orienting station may be any known mechanism that may be used to suitably detect and change the orientation of the beverage can 300. In one preferred embodiments of the present invention, the orientation station includes a receiving portion [not shown] which receives the beverage can 300 from the receiving station 532. Further, the orientation station includes a sensing mechanism [not shown] for sensing a current orientation of the beverage can 300, an orienting mechanism [not shown] for changing the orientation of the beverage can 300 and a release mechanism [not shown] for placing the beverage can 300 onto the elevator platform 561 in the top upright direction as desired.

The delivery sub-system further includes an opening mechanism 200 for opening the beverage can 300 received onto the platform 561 while being delivered from the base position B1 towards the top position T1. The opening mechanism utilized in the vending machine 500 is opening tool 200 including a single claw 220, as disclosed earlier within the current disclosure.

The vending machine 500 may further include a control unit [not shown] for managing the operations of the vending machine 500 It may be understood that the control unit may be a computing device, including typical components like, a display unit, a central processing unit (CPU), random access memory (RAM), read-only memory (ROM), at least one stored program, display readouts, and at least one input unit. The control unit is connected to the refrigerant compartment 520 and delivery sub-system 530 of the vending machine 500.

The vending machine 500 further includes a powering unit [not shown] for providing an electric current to the various components thereof. The powering unit generally connects to the control unit, the refrigerant unit 520 and the delivery sub-system 530 to provide power to various components such as motors, sensors, display units, input units, and other sub-components thereof.

In operation, when the vending machine 500 receives a beverage can 300 dispensing request from a consumer, the control unit sends an instruction to the refrigerant compartment 520 and the delivery sub-system 530 for dispensing the beverage can 300. In response to the instruction received from the control unit, the refrigerant compartment 520 releases a can 300 which is dispensed from the top compartment 551 into the receiving station 532 of the delivery sub-system 530 which is then first oriented at the orientation station and placed onto the elevator platform 561 which is vertically moved towards the delivery slot 512, where on the way, the claw tip 226 of the opening tool 200 engages and pulls the tab 314, thereby opening the beverage can 300. Thereafter, the elevator platform 561 moves through the tubular structure 513 and is parked onto the delivery slot 512, thereby making the opened beverage can 300 accessible to the consumer.

While the opening tool 100 is described for opening beverage cans having a generally cylindrical shape, it is also contemplated for a person skilled in the art that the opening tool 100 may be used to open beverage cans of the type comprising a hollow container body having various shapes such as a rectangular cross-section, or the like. In such instances, the shape of the hollow housing 110 of the opening tool 100 is changed according to the shape of the beverage can without deviating from the scope of the invention.

Figure 6:
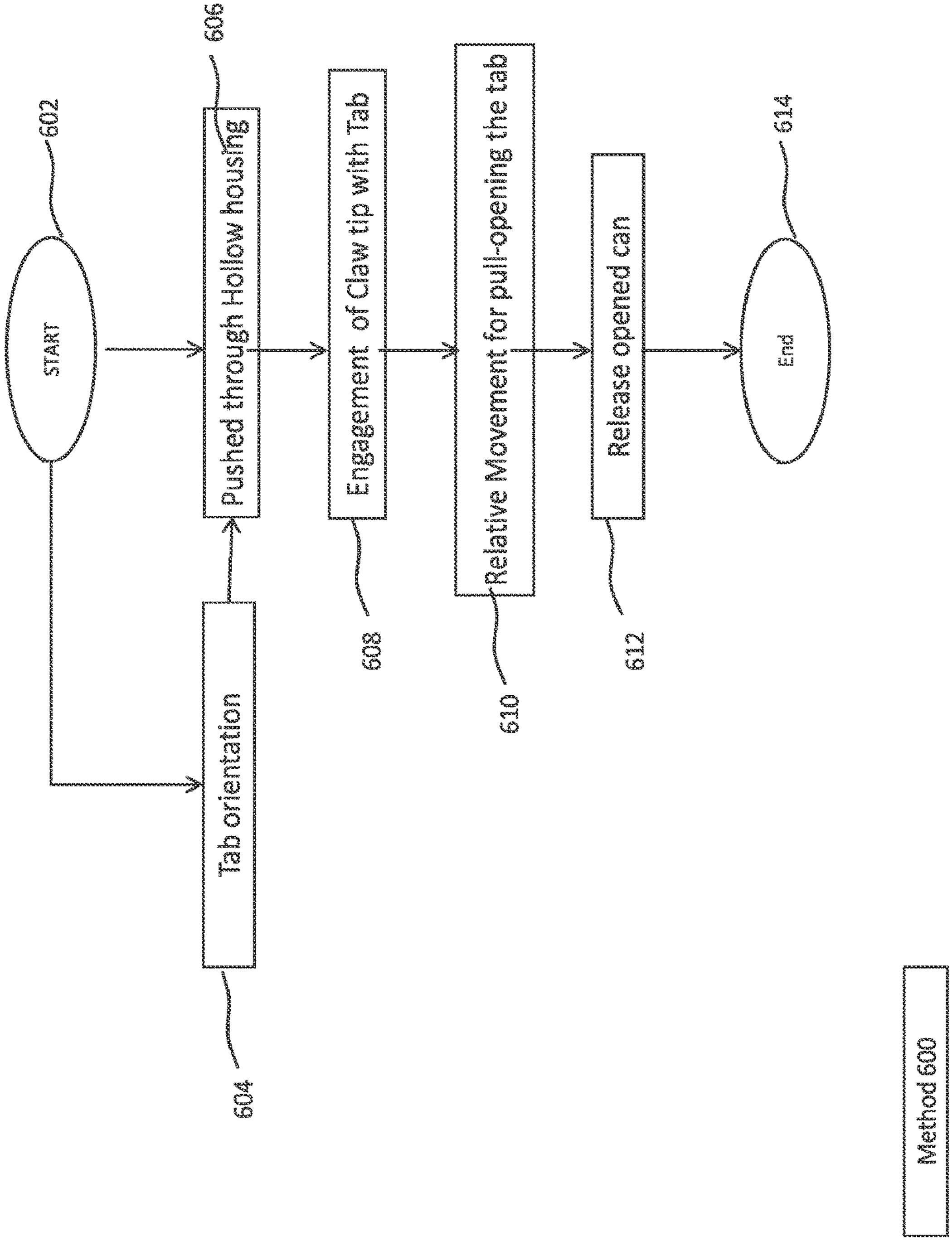
FIG. 6 depicts a flowchart illustrating the steps for opening a beverage can, in accordance with an embodiment of the present disclosure.

Referring to FIG. 6, methodology in accordance with a preferred embodiment of the claimed subject matter is illustrated. While, for purposes of simplicity of explanation, the methodology is shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Throughout the specifications of the present disclosure, the term “comprising” means including but not necessarily to the exclusion of other elements or steps. In other words, the term comprising indicates an open list. Furthermore, all directional references (such as, but not limited to, upper, lower, inner, outer, upward, downward, inwards, outwards, right, left, rightward, leftward, inside, outside, top, bottom, above, below, vertical, horizontal, clockwise, and counter=clockwise, lineal, axial and/or radial, or any other directional and/or similar references) are only used for identification purposes to aid the reader’s understanding of illustrative embodiments of the present disclosure, and may not create any limitations, particularly as to the position, orientation, or use unless specifically set forth in the claims. Moreover, all directional references are approximate and should not be interpreted as exact, but rather as describing a general indicator as to an approximate attitude.

Similarly, joinder references (such as, but not limited to, attached, coupled, connected, accommodated, and the like and their derivatives) are to be construed broadly and may include intermediate members between a connection of segments and relative movement between segments. As such, joinder references may not necessarily infer that two segments are directly connected and in fixed relation to each other.

In some instances, components are described with reference to “ends” having a particular characteristic and/or being connected with an-other part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular segment, link, component, part, member or the like. Additionally, all numerical terms, such as, but not limited to, "second", "second", "third", "fourth", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

As will be readily apparent to those skilled in the art, the present invention may easily be produced in other specific forms without departing from its essential characteristics. The present embodiments is, therefore, to be considered as merely illustrative and not restrictive, the scope of the invention being indicated by the claims rather than the foregoing description, and all changes which come within therefore intended to be embraced therein. Many variations, modifications, additions, and improvements are possible. More generally, embodiments in accordance with the present disclosure have been described in the context of preferred embodiments. Functionalities may be separated or combined in procedures differently in various embodiments of the disclosure or described with different terminology. These and other variations, modifications, additions, and improvements may fall within the scope of the disclosure as defined in the appended claims.

The invention claimed is:

1. A vending machine for dispensing a beverage can, the vending machine comprising:

an elevator shaft having a top end portion and a bottom end portion;

a movement mechanism configured to drive an upward movement of the beverage can from the bottom end portion of the elevator shaft toward the top end portion of the elevator shaft; and an opening tool including:

a hollow housing defining an open cavity configured to allow the beverage can to pass therethrough; and an opening mechanism configured to create an opening in the beverage can, wherein the opening mechanism is configured to create the opening in the beverage can prior to the beverage can exiting the vending machine, wherein the opening tool is at a spaced-apart distance from the top end portion of the elevator shaft; and wherein the beverage can is opened and then moved vertically along the elevator shaft toward the top end portion.

2. The vending machine of claim 1, wherein the opening mechanism includes at least one claw configured to engage a tab portion of the beverage can and lift the tab portion of the beverage can to create the opening in the beverage can.

3. The vending machine of claim 2, wherein the at least one claw includes a plurality of claws positioned about a circumference of the hollow housing and each having a claw tip extending radially into the open cavity.

4. The vending machine of claim 2, wherein the at least one claw includes an end portion movably connected to the hollow housing, and a claw tip configured to engage the tab portion of the beverage can.

5. The vending machine of claim 2, wherein the at least one claw has a generally concave shaped body extending towards a claw tip, wherein the claw tip is configured to slide under the tab portion of the beverage can.

6. The vending machine of claim 1, wherein the movement mechanism includes an elevating platform.

7. The vending machine of claim 1, wherein the opening mechanism includes a claw, and a tab orienting mechanism for orienting a tab portion of the beverage can in a position adjacent to the claw.

8. The vending machine of claim 7, wherein the tab orienting mechanism includes a friction wheel configured to rotate the beverage can, and a switch idler configured to sense an orientation of the tab portion of the beverage can.

9. An opening tool for creating an opening in a beverage can, the opening tool comprising:

a hollow housing having a top end, a bottom end, an inner surface, and an outer surface, the hollow housing defining an open cavity configured to allow the beverage can to pass therethrough; and an opening mechanism configured to extend within the open cavity of the hollow housing, wherein the opening mechanism is configured to create an opening in the beverage can upon the beverage can being moved upwardly through the open cavity of the hollow housing;

wherein the opening mechanism includes at least one claw and a tab orienting mechanism for orienting a tab portion of the beverage can in a position adjacent to the claw; and wherein the tab orienting mechanism includes a friction wheel configured to rotate the beverage can and a switch idler configured to sense an orientation of the tab portion of the beverage can.

10. The opening tool according to claim 9, wherein the opening mechanism includes the at least one claw pivotably coupled to the hollow housing and having a claw tip being oriented in a downward direction and protruding radially into the open cavity of the hollow housing, wherein the claw tip is configured to engage the tab portion of the beverage can and pivot from the downward direction to an upward direction, whereby the claw tip lifts the tab portion of the beverage can to create the opening in the beverage can.

11. The opening tool of claim 10, wherein the claw tip is configured to pivot from the downward direction to the upward direction in response to the beverage can moving upwardly through the hollow housing.

12. The opening tool according to claim 10, wherein the at least one claw includes a plurality of claws positioned about a circumference of the hollow housing and each having a claw tip extending radially into the open cavity.

13. The opening tool of claim 10, wherein the at least one claw has a generally concave shaped body extending towards the claw tip, wherein the claw tip is configured to slide under the tab portion of the beverage can.

14. The opening tool of claim 9, further comprising an elevating platform configured to move the beverage can upwardly through the hollow housing.

15. A method for opening and dispensing a beverage can, the method comprising:

engaging a tab portion of the beverage can with a claw of a vending machine, whereby the claw creates a drinking opening in the beverage can; and moving the opened beverage can upwardly through an elevator shaft of the vending machine and out of the vending machine.

16. The method according to claim 15, wherein engaging the tab portion with the claw includes sliding the claw under the tab portion of the beverage can and moving at least one of the claw or the tab portion of the beverage can relative to the other to open the tab portion.

17. The method according to claim 15, further comprising moving the beverage can upwardly through a hollow cavity defined by a hollow housing as the beverage can moves upwardly through the elevator shaft, the claw being pivotably coupled to the hollow housing.

18. The method according to claim 15, further comprising:

determining a location of the tab portion; and rotating the beverage can relative to the claw to position the tab portion adjacent the claw.

* * * * *